G. L. SCOTT.
CAR BRAKE.
APPLICATION FILED JAN. 3, 1920.
1,397,059.
Patented Nov. 15, 1921.
3 SHEETS—SHEET 1.
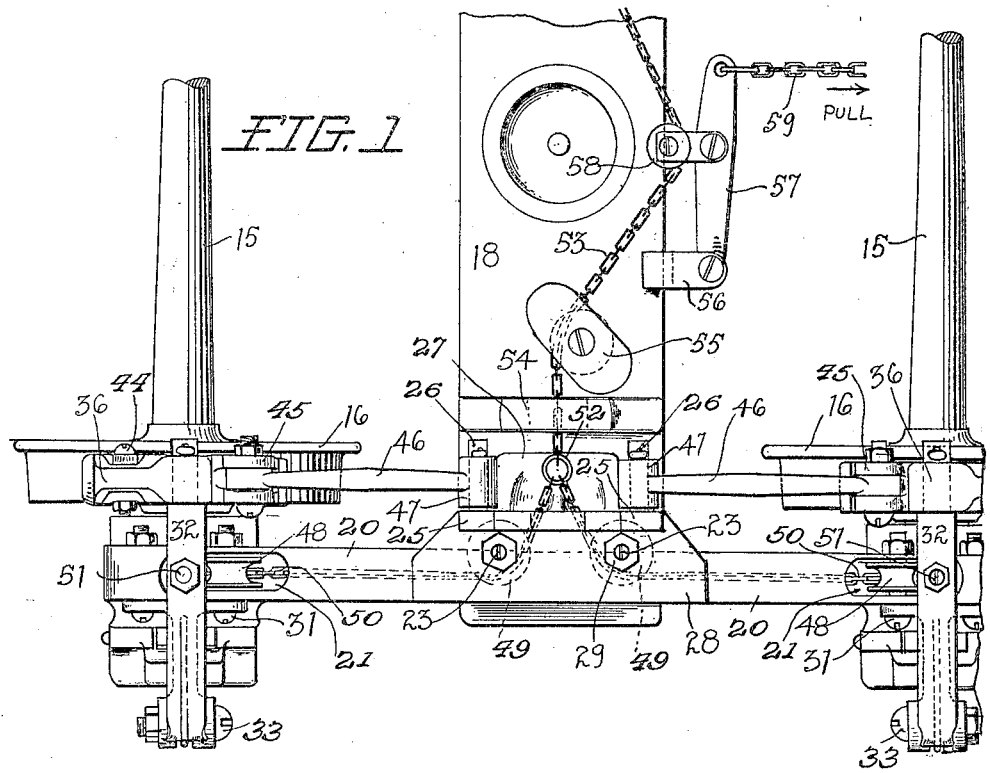
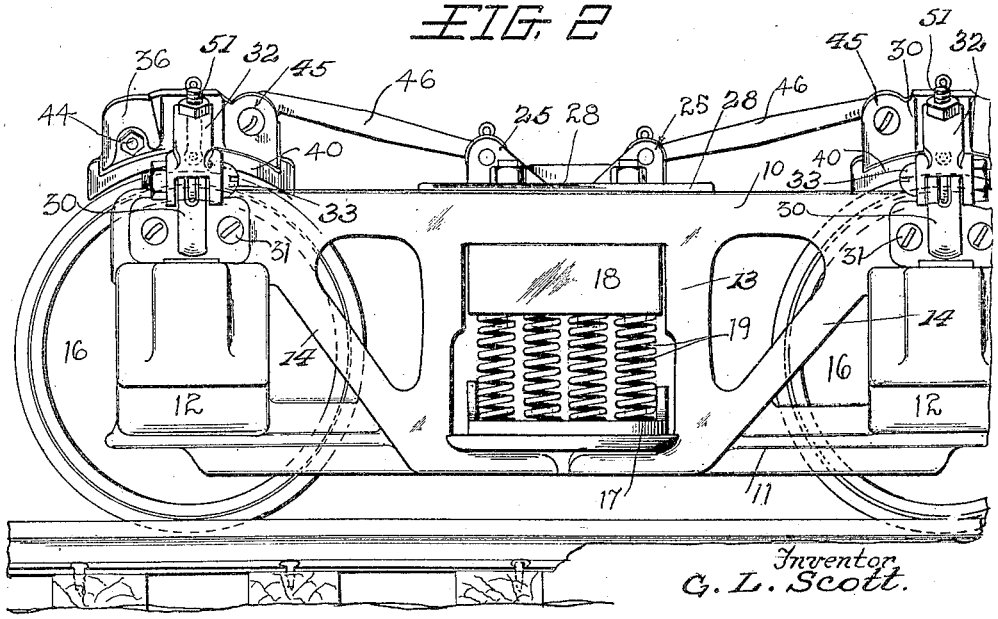
Inventor
G. L. Scott.
By Lacey & Lacey, Attys.

G. L. SCOTT.
CAR BRAKE.
APPLICATION FILED JAN. 3, 1920.
1,397,059.
Patented Nov. 15, 1921.
3 SHEETS—SHEET 2.
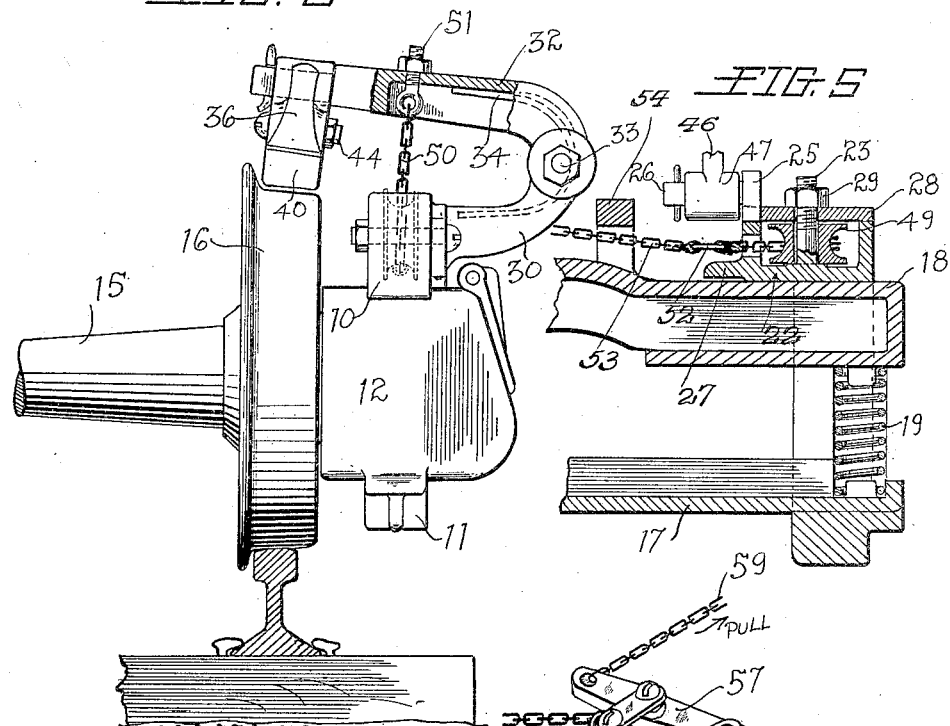
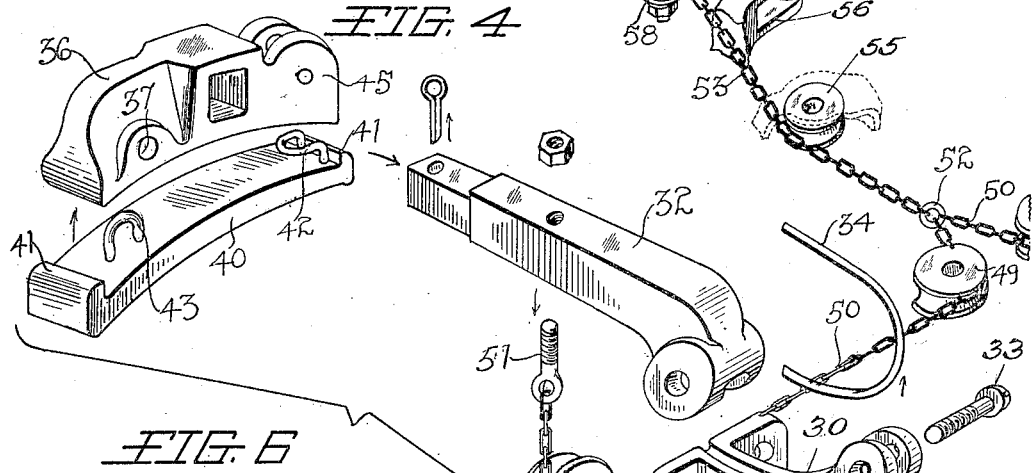
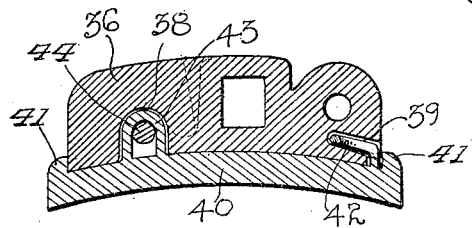
Inventor
G. L. Scott.

G. L. SCOTT.
CAR BRAKE.
APPLICATION FILED JAN. 3, 1920.
1,397,059.
Patented Nov. 15, 1921.
3 SHEETS—SHEET 3.
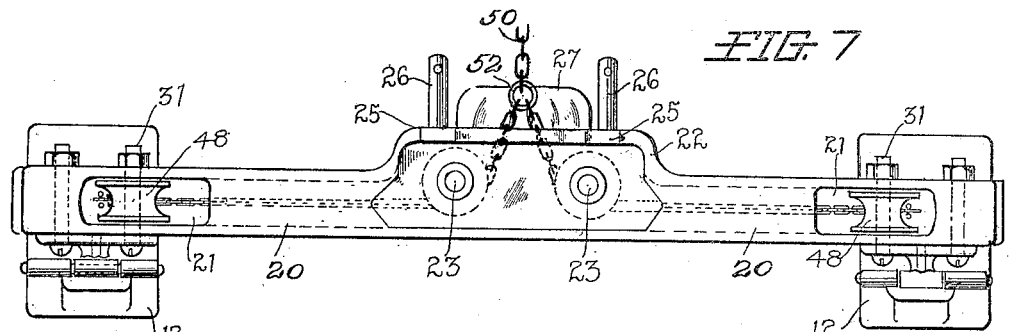
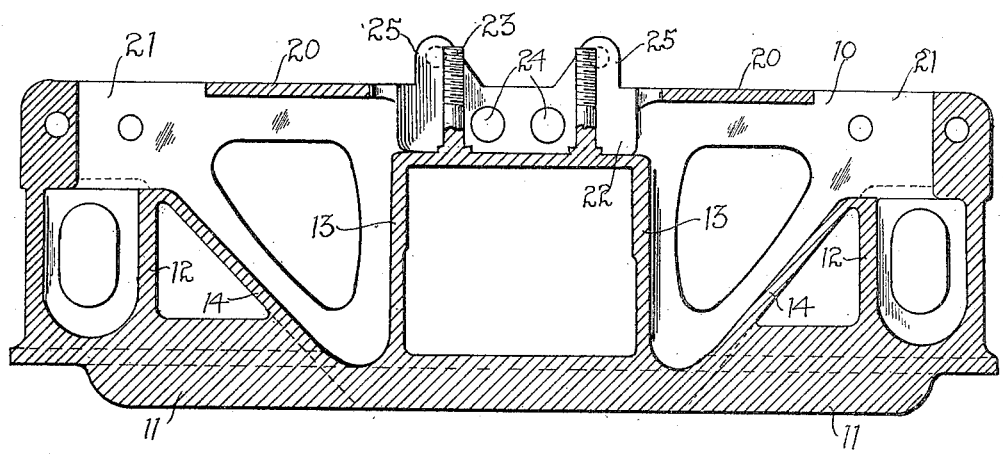
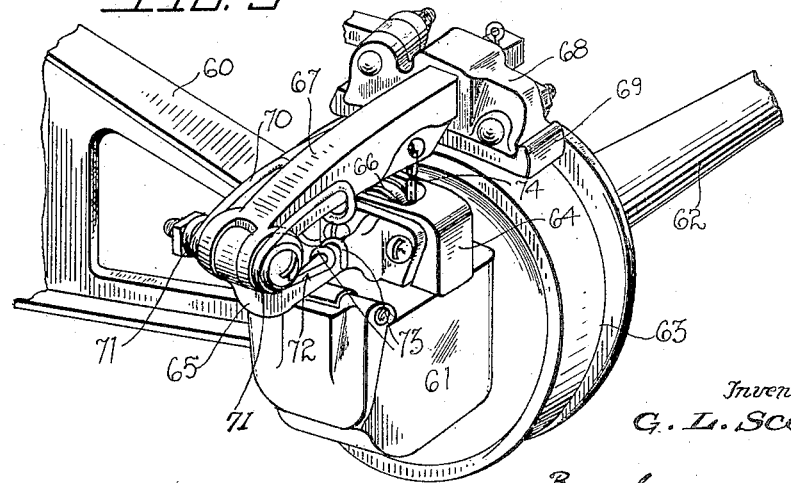
Inventor
G. L. Scott.
By Lacey & Lacey Atty's
his

UNITED STATES PATENT OFFICE.

GEORGE L. SCOTT, OF SHAWNEE, OKLAHOMA.

CAR-BRAKE.

1,397,059.   Specification of Letters Patent.   Patented Nov. 15, 1921.

Application filed January 3, 1920. Serial No. 349,182.

*To all whom it may concern:*

Be it known that I, GEORGE L. SCOTT, citizen of the United States, residing at Shawnee, in the county of Pottawatomie and State of Oklahoma, have invented certain new and useful Improvements in Car-Brakes, of which the following is a specification.

This invention relates to an improved car brake of the type shown in my Patents Nos. 1,249,675 and 1,307,422, and has as one of its principal objects to improve the efficiency of this type of brake.

The invention has as a further object to provide a brake of the type mentioned constructed to overcome the difficulties of practical installation.

A still further object of the invention is to provide, in connection with the brake, an improved truck side frame.

And the invention has as a still further object to provide a brake wherein the side frames employed will be especially designed to accommodate the improved brake mechanism.

Other and incidental objects will appear hereinafter.

In the drawings:

Figure 1 is a plan view showing one end portion of a car truck equipped with my improved brake, Fig. 2 is an end elevation of the truck and brake, Fig. 3 is a detail side elevation particularly illustrating the mounting of the brake hangers, Fig. 4 is a detail perspective view showing the construction of the hangers and associated mechanism, Fig. 5 is a fragmentary transverse section taken through one of the side frames of the truck at the spring plank and bolster, Fig. 6 is a longitudinal sectional view taken through one of the brake heads and brake shoes, Fig. 7 is a plan view showing the type of truck side frame employed, Fig. 8 is a longitudinal sectional view taken centrally through the frame, and Fig. 9 is a fragmentary perspective view showing a slightly modified form of brake hanger.

Referring more particularly to the drawings, it will be seen that I employ a truck side frame which includes, as particularly shown in Figs. 2, 7 and 8, upper and lower parallel bars 10 and 11 respectively, these bars corresponding to the usual upper and lower arch bars. However, in the present instance, the bars 10 and 11 are, as will be noted, straight while the lower bar is formed with lateral bracing flanges for increasing the rigidity thereof. Extending between the end portions of the bars and integrally formed therewith are journal boxes 12 connecting corresponding extremities of the bars. Connecting the intermediate portions of the bars is a transom 13 which is also integrally formed with said bars and bracing the side portions of this transom are bracing webs 14 sloping from the lower end portions of the sides of the transom at the bar 11 upwardly and outwardly and merging into the bar 10 at the upper ends of the journal boxes 12, the bracing webs being formed integral with the frame structure. As will be seen, the frame will thus be particularly rigid. As will, of course, be understood, one of the frames is employed at each side of the truck. However, as said frames are identical and similar brake mechanism is employed upon each frame, only one frame has been shown. Extending between corresponding ends of the frame of the truck and having the journals thereof projecting into the journal boxes 12, are the truck axles 15 which carry the truck wheels 16. A spring plank 17 is supported in the transoms of the side frames of the truck in the usual manner and extending between the transoms of the frames is a bolster 18 sustained by bolster springs 19 interposed between the ends of the bolster and the ends of the spring plank.

As best shown in Fig. 8, the upper bar 10 of the side frame is hollow as are also the bracing webs 14. However, the side portions of the bar 10 are, at the upper edge of the frame, joined by connecting webs 20 at the outer ends of which are openings 21. At the inner ends of said webs, the bar 10 of the frame is formed at its inner side with an overhanging housing 22 in which are formed spaced upstanding posts 23. In a plane between these posts the outer side wall of the housing is provided with spaced openings 24 and upstanding from the upper edge of said wall are spaced lugs 25 which carry laterally and inwardly projecting pivot studs 26. Below the openings 24, the outer side wall of this housing is further provided with a laterally directed guide lip 27 extending inwardly therefrom. The purpose of these parts will presently appear. Normally closing the housing 22 is a removable cover plate 28 therefor freely fitted over the posts 23 and notched at its outer edge to receive the lugs 25. Nuts 29 are threaded upon the posts for securing the cover plate in position.

Mounted upon the end portions of the bar 10 of the side frame above the journal boxes 12 are brake hanger brackets 30 secured by pairs of bolts extending through the base flanges of the brackets and through said bar. For convenience, the innermost of these bolts are indicated at 31. As particularly shown in Fig. 3, the brackets extend outwardly and upwardly from the frame and pivoted upon said brackets are brake hangers 32 supported by pivot bolts 33. Extending at the outer sides of these bolts and bearing between the brackets and the hangers are substantially U-shaped springs 34. As will be noted, these springs are housed by the brackets and hangers and serve to normally hold the hangers elevated. The free end portions of the hangers extend over the adjacent wheels 16 of the truck, being provided with squared outer end portions and fitting upon these end portions of said hangers are brake heads 36. Adjacent corresponding ends thereof, the brake heads are formed with transverse openings 37 and entering through the lower faces of said heads to intersect these openings are recesses 38. Formed in the heads at their opposite ends are longitudinally extending recesses 39 entering through the adjacent end walls of the heads. Fitting the curved lower sides of the heads are brake shoes 40 provided at their ends with upstanding flanges 41 adapted to coact with the end walls of the heads. At corresponding ends thereof the shoes are provided with upstanding longitudinally directed hooks 42 which engage in the recesses 39, the shanks of said hooks being received in suitable notches in the adjacent end walls of the heads and upstanding from the shoes adjacent their opposite ends are staples 43 which are received within the recesses 38. Engaged through the openings 37 to be received through the staples 43 are bolts 44 locking the shoes upon the heads, the shoes being rigidly held in position at corresponding ends thereof by the hooks 42 and at opposite corresponding ends thereof by the staples 43. At the same time, the shoes may be readily detached by simply removing the bolts 44. The shoes are, of course, curved to conform to the curvature of the truck wheels and are arranged to engage said wheels at their upper sides, being normally supported out of contact with the wheels by the brake hangers. Formed on the brake heads at their inner end are pairs of ears 45 and pivoted between each pair of ears is the outer end of a thrust rod 46. The inner ends of these rods are provided with sleeves 47 fitting upon the pivot studs 26 and held thereon by suitable cotter pins. The rods 46 will thus serve to brace the brake hangers against lateral movement under the influence of the drag of the truck wheels upon the brake shoes.

Journaled upon the bracket securing bolts 31 within the upper bar 10 of the frame are pulleys 48 and journaled upon the posts 23 within the housing 22 are similar pulleys 49. Leading through the openings 24 in the housing and trained around these pulleys are chains or other approved flexible elements 50, the outer ends of which are led through the openings 21 in the bar 10 and are engaged with eye bolts 51 adjustably connected to the brake hangers. At their inner ends the chains 50 are connected by a ring 52. Since the mechanism is duplicated at each side of the truck, one of these rings will be present at each end of the bolster and extending between said rings is a chain or other approved flexible element 53 which is carried through guides 54 upstanding from the bolster adjacent opposite ends thereof and is trained around pulleys 55 mounted upon the end portions of the bolster. Extending from the bolster is a bracket 56 and pivoted at one end upon this bracket is a brake beam 57 to the free end portion of which is pivotally connected a pulley 58. The intermediate portion of the chain 53 is trained around this pulley and connected to the outer end of the brake beam is a chain or other approved flexible element 59 leading to a hand brake or to a suitable brake cylinder. Consequently, as will be seen, by tensioning the chain 59 the lever 57 will be rocked to tension the chain 53 so that the brake shoes will be swung down simultaneously into engagement with the upper sides of the truck wheels. Upon release of tension upon the chain 59, the springs of the brake hangers will again act to immediately elevate the shoes. I accordingly provide a particularly effective type of brake mechanism as well as a particularly effectice type of truck side frame in conjunction with which the brake mechanism is adapted for use.

In Fig. 9 of the drawings, I have illustrated a slightly modified form of brake hanger and bracket. In this figure one side frame of the truck is conventionally illustrated at 60 and carried by this frame at its adjacent end is a journal box, receiving the journal at the adjacent end of an axle 62 carrying a truck wheel 63. In this modified structure I employ a block 64 which is mounted upon the upper side of the journal box to upstand therefrom and extending laterally from the outer side of this block is a brake hanger bracket 65. Engaged through the base flanges of the bracket are bolts extending through the block for securing the bracket thereto and, as will be observed, the block is recessed to receive a pulley 66 which is mounted upon one of said bolts. Pivoted at one end upon the bracket 65 is a brake hanger 67 carrying at its opposite end a brake head 68 corresponding to the brake head 36 of the preferred construction and having a shoe 69 mounted thereon, this shoe corresponding to the shoe 40. Bearing between the brake hanger and the bracket is a spring for normally holding the brake hanger elevated. This spring is preferably formed of a single length of suitable resilient material bent upon itself to provide a substantially U-shaped loop 70 engaging at its outer end beneath the hanger. At the inner end of said loop the arms thereof are coiled to provide eyes 71 which receive the pivot bolt for the brake hanger therethrough and from said eyes the end portions of the length of material are then continued to form arms 72 extending at opposite sides of the bracket 65 and provided at their inner ends with laterally directed terminals 73 engaging over the inner end portion of the bracket. As will thus be seen, the spring will be firmly secured in place while the loop 70 will bear beneath the outer end portion of the brake hanger for normally holding the brake shoe out of contact with the wheel 63. Trained over the pulley 66 and connected to the brake hanger is a chain 74 for drawing the hanger downwardly and moving the brake shoe into contact with the wheel, this chain corresponding to the chains 50 employed in connection with the preferred construction.

Having thus described the invention, what is claimed as new is:

1. In brake mechanism, a truck having a side frame including a hollow bar, pivoted brake hangers extending over adjacent wheels of the truck, means normally holding said hangers elevated, and means extending within said bar of the frame and connected to said hangers for rocking the hangers downwardly.

2. In brake mechanism, a truck having a side frame provided with a hollow upper bar, pulleys journaled in said bar, pivoted brake hangers extending over the adjacent wheels of the truck, means normally holding said hanger elevated, and means trained over said pulleys within the bar and connected to the hangers for rocking the hangers downwardly.

3. In brake mechanism, a truck having a side frame provided with a hollow bar formed with a housing, pulleys mounted in the bar adjacent its ends, pulleys mounted in the housing, pivoted brake hangers extending over adjacent wheels of the truck, means normally holding said hangers elevated, and means trained over said pulleys within the bar and housing and connected to said hangers for rocking the hangers downwardly.

4. In brake mechanism, a truck having a side frame provided with a hollow bar having a housing formed thereon, there being posts upstanding within the housing, pulleys mounted in the bar adjacent its ends, pulleys mounted upon the posts within the housing, pivoted brake hangers extending over adjacent wheels of the truck, means normally holding the hangers elevated, and means trained over said pulleys within the bar and housing and connected to said hangers for rocking the hangers downwardly.

5. In brake mechanism, a truck having a side frame provided with a hollow bar having a housing formed thereon, a cover plate for said housing, pulleys journaled in the housing, pivoted brake hangers extending over adjacent wheels of the truck, means normally holding the hangers elevated, means trained over said pulleys to extend within the housing and bar and connected to the hangers for rocking the hangers downwardly, brake heads carried by the hangers, and means extending between the cover plate and brake hangers for holding the heads against endwise movement.

6. In brake mechanism, a truck having a side frame provided with a hollow bar having a housing formed thereon, a cover plate for said housing provided with lugs having studs extending therefrom, pivoted brake hangers extending over adjacent wheels of the truck, means normally holding said hangers elevated, pulleys journaled within the housing, means trained over the pulleys to extend within the housing and bar and connected to the hangers for rocking the hangers downwardly, brake heads carried by the hangers, and thrust rods pivoted upon said studs and connected to the brake heads for holding the brake heads against endwise movement.

7. In brake mechanism, a truck having a side frame provided with a hollow bar having a housing formed thereon, there being posts upstanding within the housing, pulleys journaled upon said posts within the housing, pivoted brake hangers extending over adjacent wheels of the truck, means normally holding the hangers elevated, means trained over said pulleys to extend within the housing and bar and connected to said hangers for rocking the hangers downwardly, a cover plate for the housing, means carried by said posts and securing the plate in position, brake heads carried by the hangers, and means extending between the cover plate and said heads for holding the heads against endwise movement.

In testimony whereof I affix my signature.

GEORGE L. SCOTT. [L. s.]